US010287905B2

(12) United States Patent
Hill et al.

(10) Patent No.: US 10,287,905 B2
(45) Date of Patent: May 14, 2019

(54) SEGMENTED SEAL FOR GAS TURBINE ENGINE

(71) Applicant: UNITED TECHNOLOGIES CORPORATION, Farmington, CT (US)

(72) Inventors: James D. Hill, Tolland, CT (US); Gabriel L Suciu, Glastonbury, CT (US); Brian D. Merry, Andover, CT (US); Ioannis Alvanos, West Springfield, MA (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 404 days.

(21) Appl. No.: 15/036,019

(22) PCT Filed: Nov. 11, 2014

(86) PCT No.: PCT/US2014/064956
§ 371 (c)(1),
(2) Date: May 11, 2016

(87) PCT Pub. No.: WO2015/119687
PCT Pub. Date: Aug. 13, 2015

(65) Prior Publication Data
US 2016/0290149 A1    Oct. 6, 2016

Related U.S. Application Data

(60) Provisional application No. 61/902,555, filed on Nov. 11, 2013.

(51) Int. Cl.
*F01D 11/00*    (2006.01)
*F01D 5/08*    (2006.01)
(Continued)

(52) U.S. Cl.
CPC .............. *F01D 11/005* (2013.01); *F01D 5/06* (2013.01); *F01D 5/081* (2013.01); *F01D 9/041* (2013.01);
(Continued)

(58) Field of Classification Search
CPC .......... F01D 11/005; F01D 9/041; F01D 5/06; F01D 11/02; F01D 5/081; F01D 11/001;
(Continued)

(56) References Cited

U.S. PATENT DOCUMENTS 3,056,579 A    10/1962    Bobo
3,733,146 A *    5/1973    Smith ....................... F01D 5/06
415/173.7

(Continued)

FOREIGN PATENT DOCUMENTS

EP    0169800    1/1986
EP    867599 B1    7/2007
(Continued)

OTHER PUBLICATIONS

Extended European Search Report for European Patent Application No. 14881671.3 completed May 31, 2017.

*Primary Examiner* — Matthew W Jellett
(74) *Attorney, Agent, or Firm* — Carlson, Gaskey & Olds, P.C.

(57) ABSTRACT

One exemplary embodiment of this disclosure relates to a gas turbine engine. The engine includes a first rotor disk, a second rotor disk, and a circumferentially segmented seal. The segmented seal engages the first rotor disk and the second rotor disk. The segmented seal further includes a fore surface contacting the first disk, an aft surface contacting the second disk, and a radially outer surface. Further, (1) the aft surface and (2) one of the fore surface and the radially outer
(Continued)

surface include perforations to allow fluid to flow through the interior of the segmented seal.

16 Claims, 5 Drawing Sheets

(51) Int. Cl.
  *F01D 11/02* (2006.01)
  *F01D 5/06* (2006.01)
  *F01D 9/04* (2006.01)
(52) U.S. Cl.
  CPC .......... *F01D 11/001* (2013.01); *F01D 11/02* (2013.01); *F05D 2220/32* (2013.01); *F05D 2240/80* (2013.01); *F05D 2260/30* (2013.01); *Y02T 50/676* (2013.01)
(58) Field of Classification Search
  CPC . F05D 2260/30; F05D 2220/32; Y02T 50/676
  See application file for complete search history.

(56) References Cited

U.S. PATENT DOCUMENTS

| | | | |
|---|---|---|---|
| 3,918,832 A | 11/1975 | Shuttleworth et al. | |
| 4,094,673 A | 6/1978 | Erickson | |
| 4,139,376 A | 2/1979 | Erickson et al. | |
| 4,155,755 A | 5/1979 | Sara | |
| 4,251,272 A | 2/1981 | Sara et al. | |
| 4,529,355 A * | 7/1985 | Wilkinson | F01D 9/04 415/173.1 |
| 4,551,064 A | 11/1985 | Pask | |
| 4,659,285 A | 4/1987 | Kalogeros et al. | |
| 4,721,433 A | 1/1988 | Piendel et al. | |
| 4,884,950 A | 12/1989 | Brodell et al. | |
| 4,897,021 A | 1/1990 | Chaplin et al. | |
| 4,936,745 A | 6/1990 | Vine et al. | |
| 5,017,402 A | 5/1991 | McComas et al. | |
| 5,024,884 A | 6/1991 | Otfinoski | |
| 5,350,557 A | 9/1994 | Jarrabet | |
| 5,655,701 A | 8/1997 | Quattrocchi et al. | |
| 5,780,116 A | 7/1998 | Sileo et al. | |
| 6,089,825 A | 7/2000 | Walden et al. | |
| 6,146,091 A * | 11/2000 | Watanabe | F01D 9/04 415/111 |
| 6,352,264 B1 | 3/2002 | Dalzell, Jr. et al. | |
| 6,899,339 B2 | 5/2005 | Sanders et al. | |
| 7,032,904 B2 | 4/2006 | Rogers | |
| 7,950,900 B2 | 5/2011 | Mulcaire et al. | |
| 2007/0098545 A1* | 5/2007 | Alvanos | F01D 5/081 415/170.1 |
| 2008/0260523 A1 | 10/2008 | Alvanos et al. | |
| 2009/0238683 A1 | 9/2009 | Alvanos et al. | |
| 2010/0178160 A1 | 7/2010 | Liotta et al. | |
| 2012/0003079 A1 | 1/2012 | Farrell et al. | |
| 2013/0177387 A1 | 7/2013 | Rioux | |

FOREIGN PATENT DOCUMENTS

| | | |
|---|---|---|
| EP | 2105581 A2 | 9/2009 |
| EP | 2535523 A2 | 12/2012 |
| EP | 2615256 A1 | 7/2013 |
| EP | 2620597 A1 | 7/2013 |
| GB | 2307520 | 5/1997 |
| WO | 2014/100316 | 6/2014 |

* cited by examiner

SEGMENTED SEAL FOR GAS TURBINE ENGINE

BACKGROUND

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. Compressor and turbine sections also typically include seals, such as labyrinth seals, adjacent the blades and/or vanes to thermally isolate different portions of the engine. Labyrinth seals are known to include knife edges, which seal against a corresponding abradable land.

SUMMARY

One exemplary embodiment of this disclosure relates to a gas turbine engine. The engine includes a first rotor disk, a second rotor disk, and a circumferentially segmented seal. The segmented seal engages the first rotor disk and the second rotor disk. The segmented seal further includes a fore surface contacting the first disk, an aft surface contacting the second disk, and a radially outer surface. Further, (1) the aft surface and (2) one of the fore surface and the radially outer surface include perforations to allow fluid to flow through the interior of the segmented seal.

In a further embodiment of any of the above, the segmented seal includes a plurality of arcuate segments circumferentially arranged adjacent one another about an engine central longitudinal axis.

In a further embodiment of any of the above, at least one of a shiplap joint and a featherseal is provided between adjacent segments.

In a further embodiment of any of the above, a first ring seal is provided between the fore surface and the first disk, and a second ring seal provided between the aft surface and the second disk.

In a further embodiment of any of the above, the radially inner surface provides a first ledge and a second ledge, the first and second ledges contacting respective lips formed in the first rotor disk and the second rotor disk.

In a further embodiment of any of the above, a plurality of knife edge seals are supported on the radially outer surface.

In a further embodiment of any of the above, a plurality of stator vanes are provided between the first rotor disk and the second rotor disk, wherein the knife edge seals are configured to seal against an abradable land supported on an inner platform of the stator vanes.

In a further embodiment of any of the above, the radially outer surface and the aft surface include perforations to allow fluid to flow through the radially outer surface and the aft surface, and wherein the radially inner surface and the fore surface are substantially solid.

In a further embodiment of any of the above, a brace extends between the radially outer surface and the aft surface, the brace being substantially solid such that the brace is configured to turn a flow of fluid as the fluid passes between the perforation in the radially outer surface and the perforation in the aft surface.

In a further embodiment of any of the above, the fore surface and the aft surface include perforations to allow fluid to flow through the fore surface and the aft surface, and wherein the radially inner surface and the radially outer surface are substantially solid.

In a further embodiment of any of the above, an anti-rotation feature is between the segmented seal and one of the first disk and the second disk.

In a further embodiment of any of the above, the anti-rotation feature includes a lug received in a slot.

Another exemplary embodiment of this disclosure relates to seal for a gas turbine engine. The seal includes a plurality of arcuate seal segments arranged circumferentially adjacent one another. Each of the seal segments includes a first surface configured to contact a first rotor disk, a second surface configured to contact a second rotor disk, and an outer surface. Further, (1) the second surface and (2) one of the first surface and the outer surface include perforations to allow fluid to pass through the interior of the segmented seal.

In a further embodiment of any of the above, the outer surface supports a plurality of knife edge seals.

In a further embodiment of any of the above, an inner surface is spaced from the outer surface, the inner surface extending between the first surface and the second surface.

In a further embodiment of any of the above, each of the seal segments includes perforations in the second surface and the outer surface.

In a further embodiment of any of the above, a brace extends between the outer surface and the first surface, the brace being substantially solid and configured to turn a flow of fluid as the fluid passes between the perforation in the outer surface and the perforation in the aft surface.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
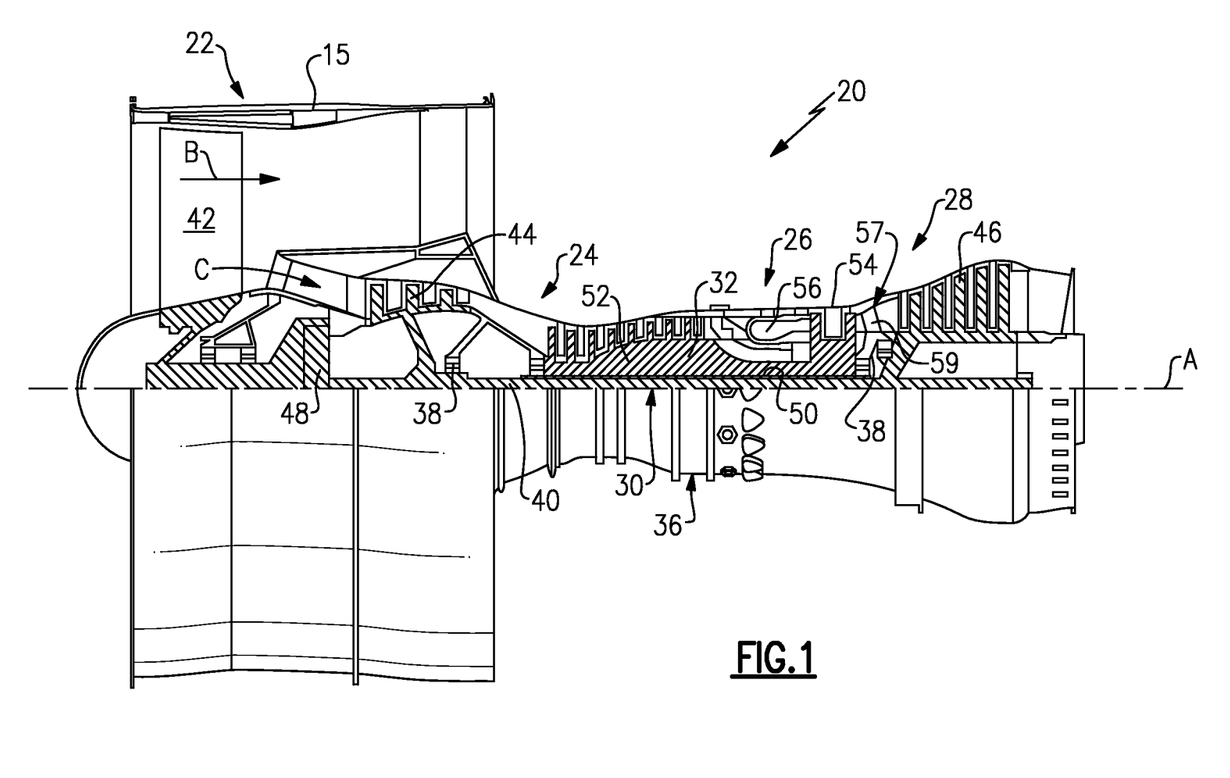
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}\ °\ R)/(518.7°\ R)]^{0.5}$. The "Low corrected fan tip speed" as disclosed herein according to one non-limiting embodiment is less than about 1150 ft/second.

Figure 2:
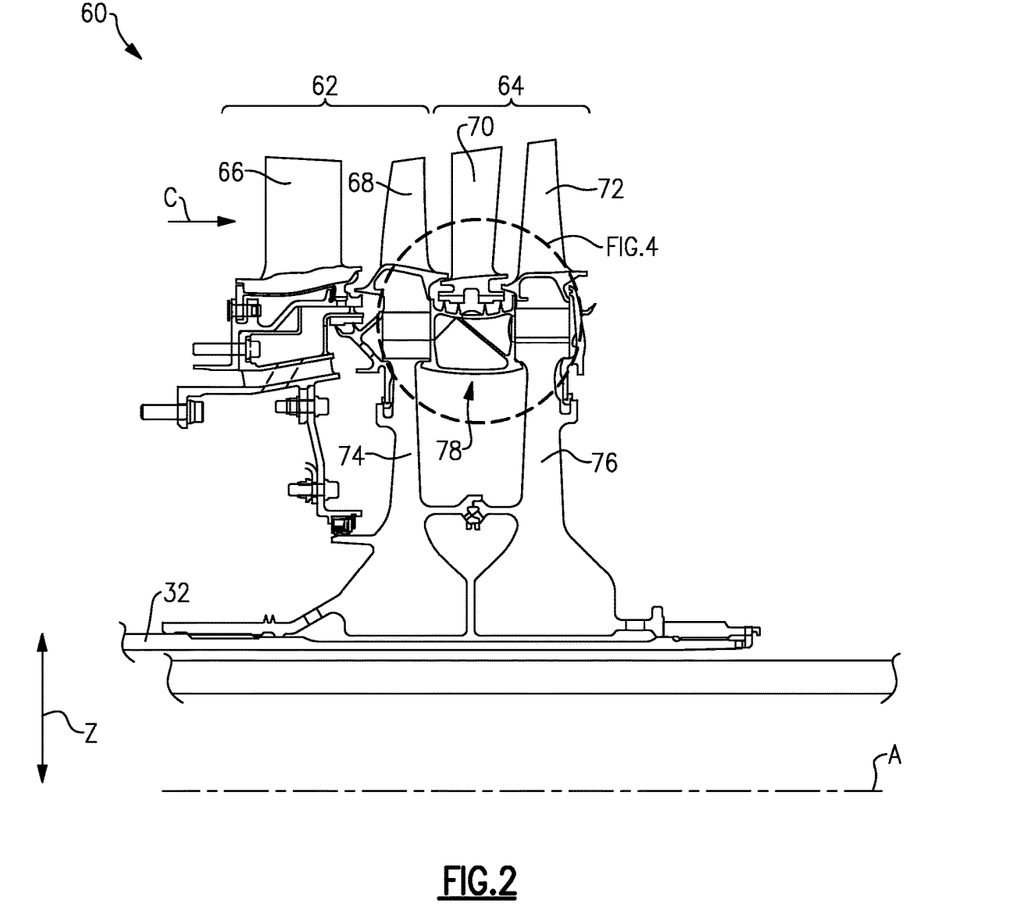
FIG. 2 illustrates a portion of a gas turbine engine.

FIG. 2 illustrates a section 60 of a gas turbine engine. In this example, the section 60 is a portion of a high pressure turbine, such as the high pressure turbine 54. While illustrated relative to a high pressure turbine, it should be understood that this disclosure extends to other engine sections.

The section 60 includes a first stage 62 and a second stage 64. The first stage 62 includes an array of first stator vanes 66 which prepare a core airflow (i.e., the flow within core flow path C) for expansion over an array of first rotor blades 68. The second stage 64 includes an array of second stator vanes 70, which prepare the core airflow for expansion over an array of second rotor blades 72. The first rotor blades 68 are rotatably attached to a first rotor disk 74 and, likewise, the second rotor blades 72 are attached to a second rotor disk 76. The first and second rotor disks 74, 76 are configured to rotate the high speed spool 32 about the engine central longitudinal axis A.

Figure 3:
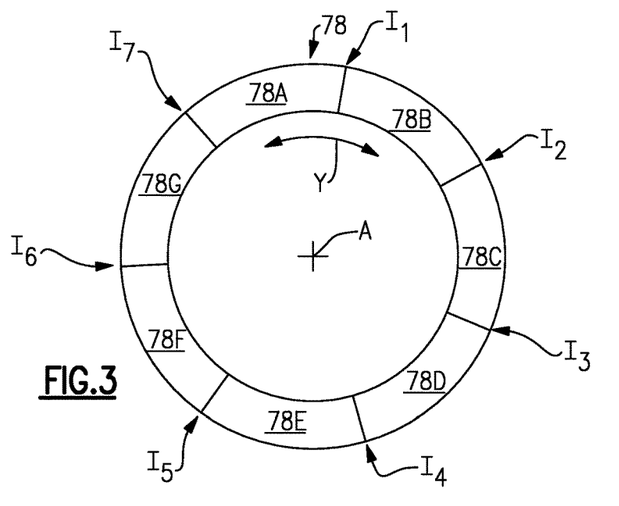
FIG. 3 schematically represents a plurality of seal segments circumferentially arranged relative to one another about an engine central longitudinal axis.

An example segmented seal 78 is provided axially between the first rotor disk 74 and the second rotor disk 76, and radially inward (in radial direction Z, which is normal to the engine central longitudinal axis A) of the second stator vanes 70. The example segmented seal 78 includes a plurality of segments arranged circumferentially relative to one another, as illustrated in FIG. 3. For instance, the segmented seal 78 may include a plurality of arcuate seal segments 78A-78G which, when arranged to circumferentially adjacent one another in the circumferential direction Y, form a hoop about the engine central longitudinal axis A. That is, the outer circumferential edges of adjacent seal segments 78A-78G abut one another at an interface $I_1$-$I_7$. The interfaces $I_1$-$I_7$ may include at least one of a shiplap joint and/or a feather seal to provide a mechanical connection between adjacent seal segments 78A-78G, as well as increased sealing to prevent leakage between the interfaces $I_1$-$I_7$.

The seal segments 78A-78G may move (e.g., from thermal expansion, vibration, stresses, etc.) relative to one another during operation of the engine 20. This relative movement reduces stresses that may result from operation of the engine 20, especially when compared to seals that are integrally formed as a single, full hoop about an engine's central axis. While seven seal segments 78A-78G are illustrated in FIG. 3, the segmented seal 78 may include any number of segments.

Figure 4:
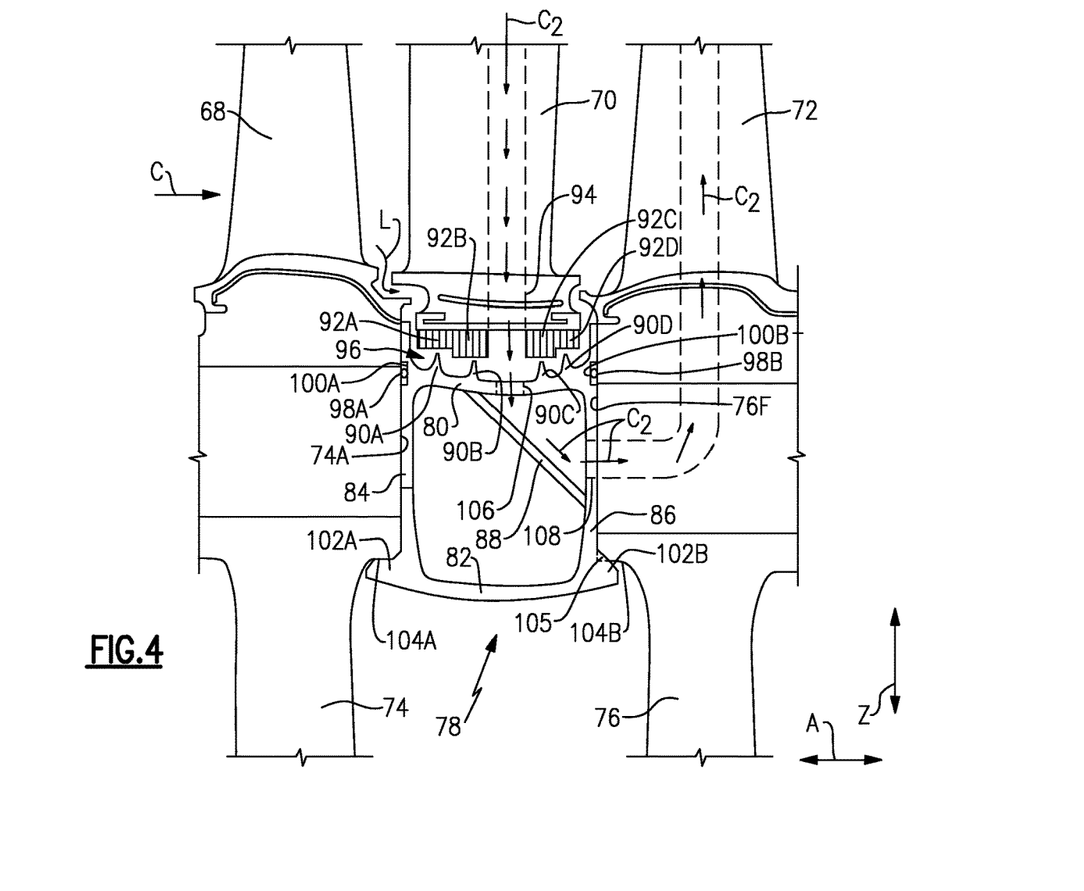
FIG. 4 is a view of the encircled portion in FIG. 2.

FIG. 4 illustrates the detail of the segmented seal 78. In one example, each of the seal segments 78A-78G includes the structure illustrated in FIG. 4. The segmented seal 78 includes a radially outer surface 80, and a radially inner surface 82 spaced-apart from the radially outer surface 80 in the radial direction Z. The segmented seal 78 further includes a fore surface 84, and an aft surface 86 axially spaced-apart from the fore surface 84. In this example, the segmented seal 78 further includes an interior brace 88 inclined at non-zero angle, relative to the radial direction Z, between the radially outer surface 80 and the aft surface 86. While an interior brace 88 is illustrated, it should be understood that the segmented seal 78 does not require a brace in all examples. The segmented seal 78 could additionally, or alternatively, include other braces extending in various directions within the interior of the segmented seal 78.

The radially outer surface 80 supports a plurality of knife edge seals 90A-90D. The knife edge seals 90A-90D extend radially outward from the outer surface 80 toward a corresponding abradable land 92A-92D. The lands 92A-92D are supported by the inner platforms 94 of the second stator vanes 70. The lands 92A-92D in one example may be a honeycomb structure, as is known in the art. The knife edge seals 90A-90D and the abradable lands 92A-92D define a labyrinth seal 96, which resists a leakage flow L of the core airflow around the second stator vanes 70.

In this example, radially outer surface 80 continuously extends between the fore surface 84 and the aft surface 86. The fore surface 84, in turn, directly abuts an aft surface 74A the first rotor disk 74. In this example, each of the fore surface 84 and the aft surface 74A are substantially planar, and extend generally in the radial direction Z. The aft surface 86 similarly abuts a fore surface 76F of the second rotor disk 76. Optionally, ring seals 98A, 98B may be provided in grooves 100A, 100B between the surfaces 84 and 74A, and the surfaces 86 and 76F to increase sealing at the respective interfaces.

In this way, the segmented seal 78 axially spans the distance between the first rotor disk 74 and the second rotor disk 76, which provides an increased level of sealing between the core flow path C and the first and second rotor disks 74, 76. In particular, should the labyrinth seal fail, a substantial portion of the relatively hot leakage flow L would pass back into the core flow path C, rather than being directed radially inward toward the first and second rotor disks 74, 76.

The engagement between the first and second rotor disks 74, 76 and the fore and aft surfaces 84, 86 compresses the segmented seal 78 to support the segmented seal 78 relative to the remainder of the engine 20. The segmented seal 78 is further supported relative to the first and second rotor disks 74, 76 by ledges 102A, 102B projecting from the radially inner surface 82, which are arranged relative to corresponding lips 104A, 104B of the first and second rotor disks 74, 76. One or more of the lip-ledge interfaces may provide an anti-rotation feature 105, such as a lug projecting into a slot, to prevent the segmented seal 78 from rotating circumferentially relative to the first and second rotor disks 74, 76.

Figure 5:
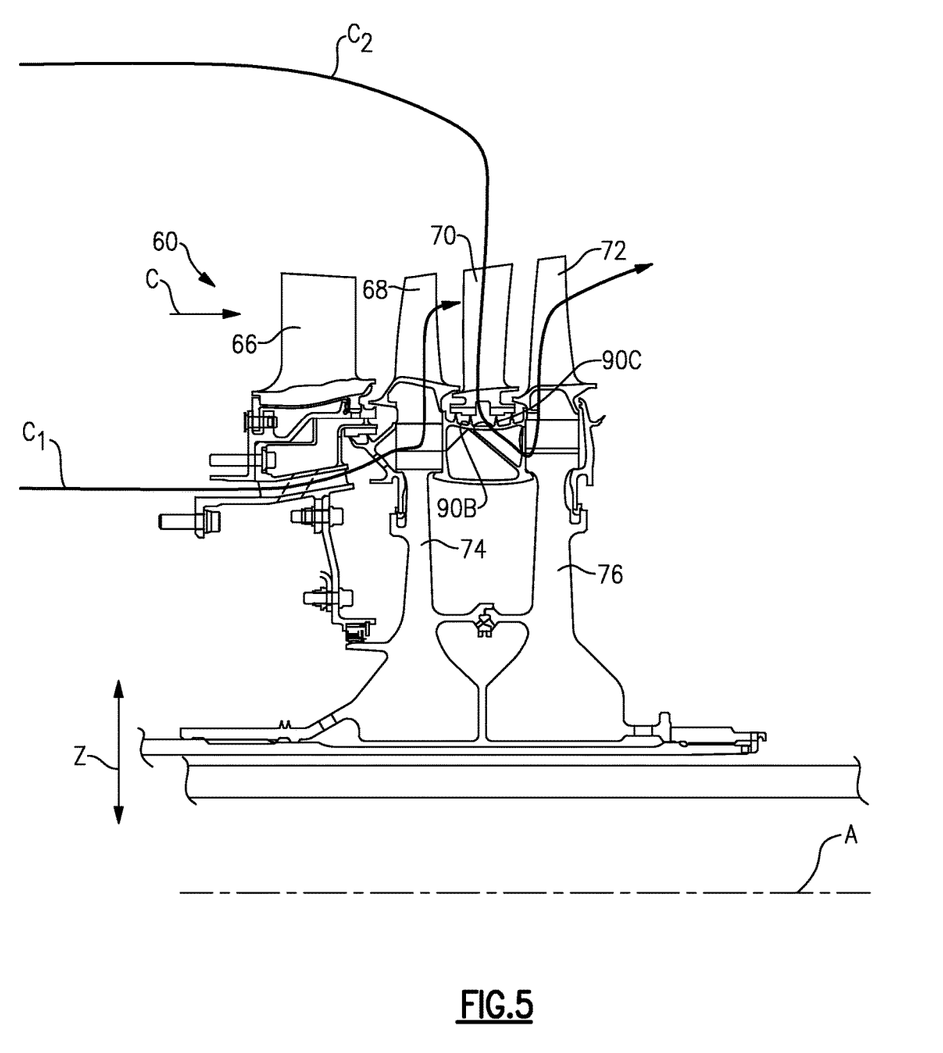
FIG. 5 schematically illustrates a first example cooling configuration relative to the section of the engine illustrated in FIG. 2.
Figure 6:
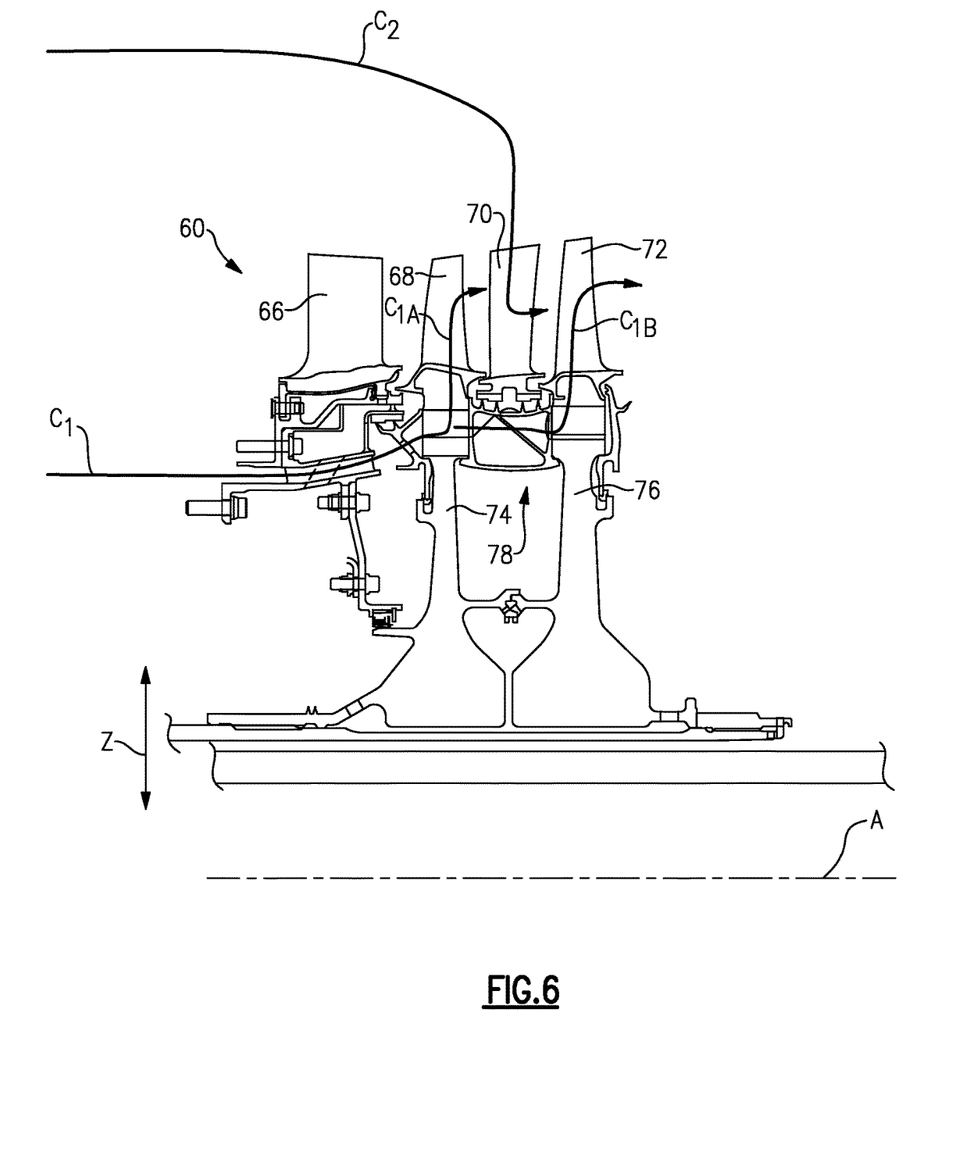
FIG. 6 schematically illustrates a second example cooling configuration.

The various surfaces and structures associated with the segmented seal 78 may optionally be solid or include perforations (e.g., orifices) to accommodate a particular cooling flow path. FIGS. 5-6 illustrate two example cooling arrangements.

With reference to the cooling arrangement of FIG. 5, a first cooling flow path $C_1$ extends from a tangential on-board injector (or, TOBI), for example, into the first disk 74, radially outward through the first rotor blades 68 and into the core flow path C. A second cooling flow path $C_2$ is provided from radially outward location, and is sourced from a mid-stage or HPC bleed, as examples. The second cooling flow path $C_2$ flows radially through the second stator vanes 70, and exits the second stator vanes 70 adjacent a gap between lands 92B and 92C. The second cooling flow path $C_2$ then moves radially between the knife edge seals 90B, 90C and through a first perforation 106 in the radially outer surface 80 of the segmented seal 78 (FIG. 4). Some of the leakage flow L may enter the second cooling flow path $C_2$, however the effects of the leakage flow L may be minimal. The brace 88 (FIG. 4) is substantially solid in this example, and turns the fluid within the second cooling flow path $C_2$ axially toward a second perforation 108 in the aft surface 86. The second cooling flow path $C_2$ then radially turns to provide a flow of fluid to cool the second rotor blades 72.

A second example cooling configuration is illustrated in FIG. 6. In FIG. 6, a first flow path $C_1$ is directed toward the first disk 74 from a TOBI. Within the first disk 74, the first flow path $C_1$ splits into a first portion $C_{1-A}$, which is directed radially outward to cool the first rotor blades 68, and a second portion $C_{1-B}$, which is directed axially through the first rotor disk 74. The second portion $C_{1-B}$ then passes axially through the segmented seal 78. In this example, the fore surface 84, the brace 88, and the aft surface 86 of the segmented seal would include perforations, whereas the outer surface 80 and the inner surface 82 would be solid. In this example, the second stator vanes 70 may be cooled with a second flow path $C_2$, which would flow through the second stator vanes 70 and exit out a trailing edge in the second stator vanes 70 into the core flow path C.

While two example cooling configurations have been illustrated across FIGS. 5-6, this disclosure extends to other cooling configurations. The segmented seal 78 can be modified to accommodate a particular cooling configuration without departing from the scope of this disclosure.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A gas turbine engine, comprising:
   a first rotor disk;
   a second rotor disk; and
   a circumferentially segmented seal engaging the first rotor disk and the second rotor disk, wherein the segmented seal includes a fore surface directly abutting an aft surface of the first rotor disk, an aft surface directly abutting a fore surface of the second rotor disk, a radially inner surface extending between the fore surface of the segmented seal and the aft surface of the segmented seal, and a radially outer surface spaced radially further from an engine central longitudinal axis than the radially inner surface and extending between the fore surface of the segmented seal and the aft surface of the segmented seal, and wherein the aft surface of the segmented seal and the radially outer surface of the segmented seal include perforations to allow fluid to flow through an interior of the segmented seal from the radially outer surface of the segmented seal to the aft surface of the segmented seal, and wherein the radially inner surface and the fore surface are solid.

2. The gas turbine engine as recited in claim 1, wherein the segmented seal includes a plurality of arcuate segments circumferentially arranged adjacent one another to form a hoop about an engine central longitudinal axis.

3. The gas turbine engine as recited in claim 2, wherein at least one of a shiplap joint and a featherseal is provided between adjacent segments.

4. The gas turbine engine as recited in claim 1, including a first ring seal provided between the fore surface and the first rotor disk, and a second ring seal provided between the aft surface and the second rotor disk.

5. The gas turbine engine as recited in claim 1, wherein the radially inner surface of the segmented seal provides a first ledge and a second ledge, the first and second ledges contacting respective lips formed in the first rotor disk and the second rotor disk.

6. The gas turbine engine as recited in claim 1, wherein a plurality of knife edge seals are supported on the radially outer surface.

7. The gas turbine engine as recited in claim 6, including a plurality of stator vanes provided between the first rotor disk and the second rotor disk, wherein the knife edge seals are configured to seal against an abradable land supported on an inner platform of the stator vanes.

8. The gas turbine engine as recited in claim 1, including a brace extending between the radially outer surface and the aft surface, the brace being solid such that the brace is configured to turn a flow of fluid as the fluid passes between the perforation in the radially outer surface and the perforation in the aft surface.

9. The gas turbine engine as recited in claim 1, including an anti-rotation feature between the segmented seal and one of the first disk and the second disk.

10. The gas turbine engine as recited in claim 9, wherein the anti-rotation feature includes a lug received in a slot.

11. A seal for a gas turbine engine, comprising:
a plurality of arcuate seal segments arranged circumferentially adjacent one another, each of the seal segments including:
a first surface configured to contact a first rotor disk;
a second surface configured to contact a second rotor disk;
an inner surface;
an outer surface radially spaced-apart from the inner surface, wherein the second surface and the outer surface include perforations to allow fluid to pass through an interior of the segmented seal, and wherein the first surface and the inner surface are solid.

12. The seal as recited in claim 11, wherein the outer surface supports a plurality of knife edge seals.

13. The seal as recited in claim 11, including a brace extending between the outer surface and the first surface, the brace being solid and configured to turn a flow of fluid as the fluid passes between the perforation in the outer surface and the perforation in the aft surface.

14. The gas turbine engine as recited in claim 1, wherein the fore surface of the segmented seal and the aft surface of the segmented seal are planar and extend in a radial direction normal to an engine central longitudinal axis.

15. The gas turbine engine as recited in claim 14, wherein a portion of the aft surface of the segmented seal which is planar and radially-extending includes perforations extending therethrough.

16. The gas turbine engine as recited in claim 14, wherein the aft surface of the first rotor disk and the fore surface of the second rotor disk are planar and extend in the radial direction.

* * * * *